J. LOWE.
SPRING WHEEL.
APPLICATION FILED MAY 29, 1911.
1,015,199.
Patented Jan. 16, 1912.
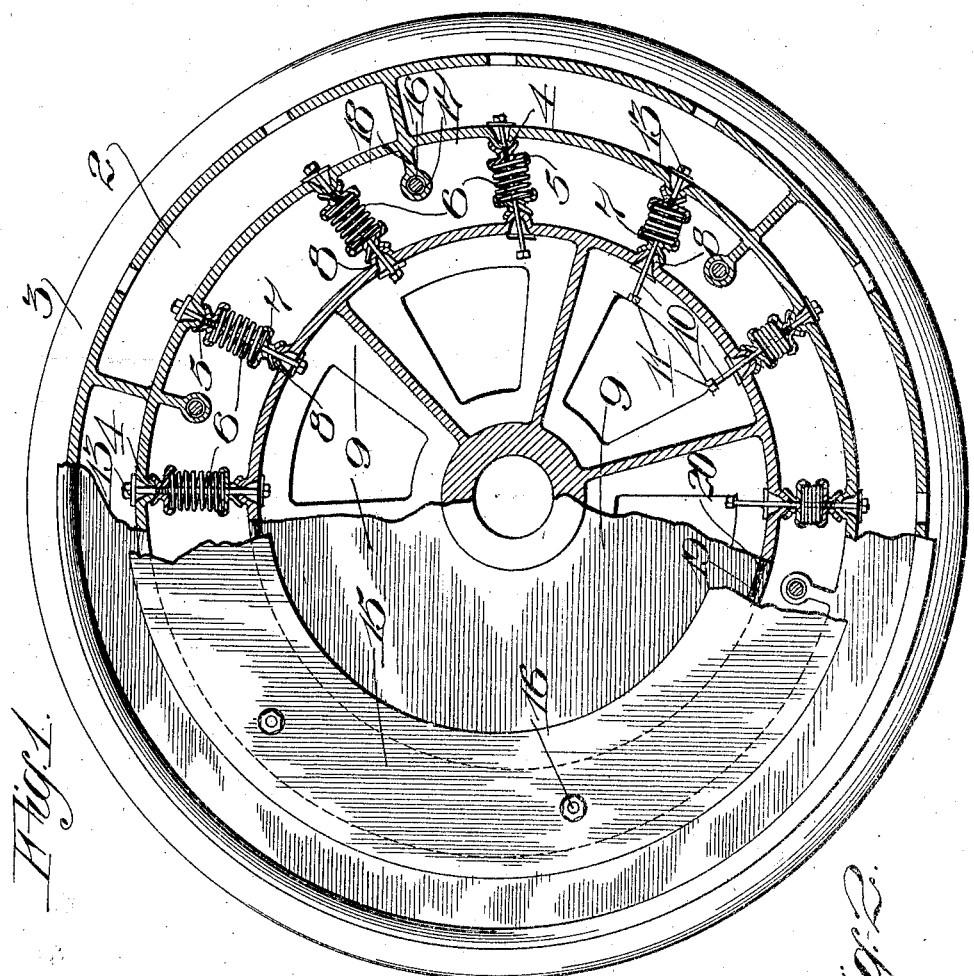
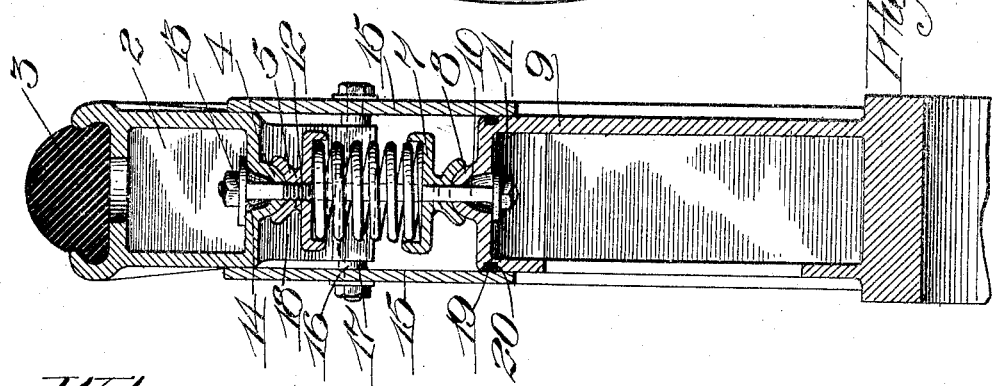

UNITED STATES PATENT OFFICE.

JAMES LOWE, OF SAN FRANCISCO, CALIFORNIA, ASSIGNOR OF ONE-THIRD TO JOHN PELLAXIO, OF SAN FRANCISCO, CALIFORNIA.

SPRING-WHEEL.

1,015,199.  Specification of Letters Patent.  Patented Jan. 16, 1912.

Application filed May 29, 1911. Serial No. 629,965.

*To all whom it may concern:*

Be it known that I, JAMES LOWE, citizen of the United States, residing in the city and county of San Francisco and State of California, have invented new and useful Improvements in Spring-Wheels, of which the following is a specification.

This invention relates to wheels, and particularly to spring wheels.

The object of the present invention is to provide a simple, powerful, resilient wheel so designed that a cushioning effect, the equivalent of that acquired by pneumatic tires, is possible, and which obviates the use of pneumatic, puncturable tubes; and to provide a spring wheel of few parts readily adaptable for adjustment and renewal when necessary, and which is light and durable.

The invention consists of the parts and the construction and combination of parts, as hereinafter more fully described and claimed, having reference to the accompanying drawings, in which—

Figure 1 is a side elevation in partial section of the wheel. Fig. 2 is a transverse vertical section through the wheel.

The present embodiment of the wheel comprises a substantial, cellular, annular rim or peripheral section 2, of appropriate width and thickness, to the outer surface of which may be attached in any appropriate manner, a soft or pliable tread 3, of rubber or other equivalent substitute. The side faces of the peripheral rim 2 may be slightly dished or inclined toward the center of the wheel.

Upon the inner circular surface of the rim 2 there are formed a plurality of hemispherical seats or protuberances 4, of which there may be as many equally spaced around the rim as desirable. Upon each of these hemispherical seats is a movable socket washer 5 forming a wearing plate against which one end of an expansible spring 6 bears; the opposite end of said spring bearing against a similar socket washer, 7, disposed against and movable upon a corresponding hemispherical protuberance 8, formed upon the outer periphery of an integral cellular hub member 9.

The outer tread section 2 and the central hub section 9 are sustained concentrically relative each other by the reaction of the several expansible, resilient devices, indicated here by the springs 6. To prevent too great an eccentric movement of these members relative each other, I provide central, limiting stays or bolts, having heads 11 within the circular wall of the hub 9, which is slotted slightly peripherally to allow the several limiting rods or bolts 10 to play considerably. The bolts 10 pass outwardly through the hub 9 and through the seat members 8, and fit snugly in the washers 7 upon which the springs 6 seat. The outer ends of the several bolts 10 are threaded, as at 12, and are adjustable in the spring supporting washers 5, so that the latter may be advanced toward and from the heads 11 of the bolts 10 for the purpose of increasing or decreasing the compression in the several springs. The bolts 10 project somewhat beyond the washers 5 and into the cells of the rim 2, and have upon their outer ends adjustable lock nuts 13, the functions of which are to limit the eccentric motion of the hub 9 relative the rim section 2; and also to provide a positive tie or connection between the hub 9 and the section 2 so that power can be transmitted from the hub to the rim 2 when the wheel is adapted to be used as a driving member in a vehicle.

The inner annular wall of the rim 2 is slotted at 14 to allow an angular movement of a bolt 10 so that any action, of such of the tie rods or bolts 10 within their respective springs as are approximately horizontal, may rock as the hub 9 moves downwardly relative the section 2. This eccentric movement of the hub 9 being substantially constant during the running of the wheel, when a load is imposed upon the hub it is necessary to provide ample room and clearance for angular movement of the several tie bolts 10 at their respective connections to the hub 9 and the rim 2.

In assembling the wheel, the several bolts are inserted so as to project outwardly through the annular wall of the hub 9. The central spring seats 7 pass down over the bolts so as to rest upon their respective seats 8, and then the springs 6 placed around the bolts 10 and against the seats 7. Then the outer adjustable seats 5 are screwed down upon the several bolts 10, to compress the springs 6 sufficiently to allow the outer ends of the bolts 10 to be inserted into the respective openings 14, provided for their reception in the inner annular wall of the section 2, after which the adjustable lock nuts 11

13 can be adjusted upon the outer ends of the limiting bolts 10. Then the adjustable washers 5 can be moved outwardly along their screw threads 12 until they bear upon their respective seats 4 and continuing their adjustment until the reaction of the several springs 6 will be equalized, and thus bring the hub 9 to a concentric position relative the rim 2.

For the purpose of protecting the resilient cushions from the exposure to damage and grit, I provide a pair of flat, removable and interchangeable rings 15, of sufficient width to project sufficiently over the hub and rim sections to form a chamber, in which will be protected the springs and bolts. The detachable guard plates 15 are held in position relative the outer section 2 by bolts or other equivalent fastening devices 16, which pass through bushings 17 mounted in transversely disposed, perforated ribs or hangers 18, which are formed integral with the rim section 2. The hangers 18 are spaced equally around the rim centrally between the hemispherical seats 4, upon which the spring washers rest. The plates 15 are drawn tightly into position against the ends of the bushings 17 by the bolts 16. The outer edges of the guard plates 15 rest upon the faces of the section 2. The inner edges of the guard plates 15 lap the side faces of the hub 9 to allow a free movement radially of the hub between the plates 15. In order to prevent the entrance of deleterious material into the chamber formed by the plates 15, suitable packing devices, as fibrous rings 19, may be placed in grooves 20 formed for their reception on the sides of the hub 9.

When the wheel is subjected to load and in motion, the hub 9 will constantly bear an eccentric relation to the section 2, and those several springs which are below a horizontal line through the rim 2 will incline downwardly toward the center of the hub; and those springs below the center of the hub will be under compression, thus resiliently supporting the wheel. An extreme eccentric movement of the hub and the rim is prevented by the lock nuts 13, engaging the inner annular wall of the rim 2.

Having thus described my invention, what I claim and desire to secure by Letters Patent, is—

1. A spring wheel, comprising a hollow rim, a hollow hub, said rim and hub having annular walls in juxtaposition, pairs of radially alined hemispherical seats formed upon said walls, said seats being perforated, washers having sockets seatable upon said seats, expansible springs interposed between the opposed washers, limiting bars passing through said springs and through the perforations in said seats, apertured guard plates spanning the space between the rim and hub, and clamping members passing through said guard plates to thereby secure the plates to the rim and press the same against the hub.

2. An improved spring wheel, having in combination a hollow rim, a hollow hub, said rim and hub being provided with annular walls in juxtaposition, pairs of radially alined hemispherical seats formed upon said walls, said seats having central perforations, washers having sockets engaging said seats, expansible springs interposed between the opposed washers, limiting bars passing through said springs and through the perforations in said seats, guard plates attachable to the sides of the rim and permitting eccentric movement of the hub relative to the rim, and spaced hangers projecting inwardly over the rim and provided with openings, and bolts passing through the perforations in the hangers and through like perforations in the guard plates whereby the latter are secured in place.

In testimony whereof I have hereunto set my hand in the presence of two subscribing witnesses.

JAMES LOWE.

Witnesses:
 JAS. J. CAREY,
 WM. REED.